(12) United States Patent
Burke

(10) Patent No.: US 6,898,792 B1
(45) Date of Patent: May 24, 2005

(54) FOREIGN OBJECT DEFINITION INFORMATION REPOSITORY

(75) Inventor: Mark W. Burke, Dublin (IE)

(73) Assignee: IONA Technologies, PLC, Dublin (IE)

( * ) Notice: Subject to any disclaimer, the term of this patent is extended or adjusted under 35 U.S.C. 154(b) by 0 days.

(21) Appl. No.: 09/025,143

(22) Filed: Feb. 18, 1998

(51) Int. Cl.$^7$ .................................................. G06F 9/44
(52) U.S. Cl. ...................................................... 719/315
(58) Field of Search ................................. 719/315, 316; 717/136, 137, 138, 5; 707/103, 104.1, 104; 709/203, 303, 315, 316; 395/705

(56) References Cited

U.S. PATENT DOCUMENTS

| | | | |
|---|---|---|---|
| 4,905,138 A | | 2/1990 | Bourne ........................ 364/200 |
| 4,994,998 A | | 2/1991 | Anezaki ....................... 364/900 |
| 5,146,593 A | * | 9/1992 | Brandle et al. .............. 395/700 |
| 5,210,535 A | | 5/1993 | Fujita ............................ 341/51 |
| 5,261,080 A | * | 11/1993 | Khoyi et al. ................. 395/500 |
| 5,263,137 A | | 11/1993 | Anezaki ....................... 395/200 |
| 5,291,583 A | | 3/1994 | Bapat .......................... 395/500 |
| 5,317,742 A | | 5/1994 | Bapat .......................... 395/700 |
| 5,341,478 A | * | 8/1994 | Travis, Jr. et al. .......... 395/200 |
| 5,367,635 A | | 11/1994 | Bauer et al. ................. 395/200 |
| 5,418,963 A | | 5/1995 | Anezaki ....................... 395/700 |
| 5,452,433 A | | 9/1995 | Nihart et al. ................ 395/500 |
| 5,519,868 A | | 5/1996 | Allen et al. .................. 395/700 |
| 5,539,909 A | | 7/1996 | Tanaka et al. ............... 395/700 |
| 5,542,078 A | * | 7/1996 | Martel et al. ................ 395/600 |
| 5,602,993 A | | 2/1997 | Stroemberg .............. 395/200.1 |
| 5,613,100 A | | 3/1997 | Anezaki ....................... 395/500 |
| 5,627,979 A | * | 5/1997 | Chang et al. ................ 395/335 |
| 5,632,035 A | | 5/1997 | Goodwin ..................... 395/705 |
| 5,642,511 A | | 6/1997 | Chow et al. ................. 395/701 |
| 5,649,227 A | | 7/1997 | Anezaki ....................... 395/800 |
| 5,732,270 A | * | 3/1998 | Foody et al. ................ 395/683 |
| 5,764,947 A | * | 6/1998 | Murphy et al. ............. 395/500 |
| 5,960,200 A | * | 9/1999 | Eager et al. ................. 395/705 |

OTHER PUBLICATIONS

IBM TDB, "Multidomain Network Management Using Common Object Request Broker Architecture", Jun., 1997, pp 91–92.*

J. Purtilo, et al, "Module Reuse by Interface Adaption", Software Practice and Experience, vol. 21 (6), Jun., 1991, pp. 539–556.*

E. Gamma, et al, Design Patterns Elements of Reusable Object–Oriented Software, Addison–Wesley, 1995, pp. 897–996, 139–150.*

E. Gamma, et al, Design Patterns Elements of Reusable Object–Oriented Software, Addion–Wesley, 1995, pp. 97–106.*

J. Callahan, et al, "A Packaging System for Heterogeneous Execution Environments", IEEE, vol. 17, No. 6, pp. 626–635, Jun. 1991.*

Digital Equipment Corporation, COM/CORBA Internetworking, OMG Document Aug. 18, 1995.*

(Continued)

*Primary Examiner*—Sue Lao
(74) *Attorney, Agent, or Firm*—Lacasse & Associates, LLC; Randy W. Lacasse; Ramraj Soundararajan

(57) ABSTRACT

Object definition information is encapsulated in a first notation in encapsulator objects which are defined at least in part in a second, typically different, notation. The encapsulator objects expose native interfaces that may be interrogated to discover the foreign object definition information they encapsulate. Additionally, one or more objects corresponding to an interface associated with a target object can be instantiated (with the target object's interface being defined in a first notation and objects has an interface defined in a second notation which is statically acquired by an invoker), with such object invocation performed without run-time discovery of interfaces. Similarly, a calling object calls a target object by invoking the objects defined in the second notation without the calling object having to discover any interfaces at run-time.

13 Claims, 3 Drawing Sheets

OTHER PUBLICATIONS

T. J. Mowbray, et al, The Essential CORBA: System Integration Using Distributed Objects, Chapter 8: Object Wrapper Techniques. pp. 231–267, 0/94.*

The Common Object Request Broker: Architecture and Specification, Revision 1.1. Dec. 1991.*

An Analysis of the OSI Systems Management Architecture from an ODP Perspective, Guy Genilloud, IEEE, pp. 72–81.

Huitema, Christian et al., "Defining Faster Transfer Syntaxes for the OSI Presentation Protocol", Computer Communication Review, vol. 19, No. 5 (Oct., 1989) pp44–55.

Bassiouni, M. et al., "Interoperability Overhead in OSI Communication Networks", IEE GLOBECOM 93, Technical Program Conference Record, vol. 1 of 4, (Nov. 29,–Dec. 2, 1993) pp661–665.

Rossi, Kari et al., "Q3E: $Q_3$Emulator Agent", 1994 IEEE Network Operations and Management Symposium Record, vol. 1 of 3 (Feb. 14–17, 1994) pp70–78.

Bassiouni, M. et al., "Flexible Transfer Syntax for Interoperable Training Net works", MILCOM 94 Conference Record, vol. 1 of 3 (1994) pp205–209.

Bassiouni, M. et al., "Performance Test and Flexible Decoding for Transfer Syntax in Real–time Applications", 1994 IEEE 13th Annual International Conference on Computers and Communications (Apr. 12–15, 1994) pp134–140.

Saleh, Kassem et al., "Synthesizing Communication Gateways from Protocol and Service Specifications", 1994 IEEE 13th Annual International Conference on Computers and Communications (Apr. 12–15, 1994) pp141–147.

Sugauchi, Kiminori et al., "A Method to Develop Common Management Service in Many Management Application Programs Based on Management Service Specification Using GDMO Template", 1996 IEEE Network Operations and Management Symposium, vol. 1 (Apr. 15–19, 1996) pp282–285.

Wallach, Deborah A. et al., "ASHs: Application–Specific Handlers for High–Performance Messaging", ACM SIG-COMM '96 Conference Proceedings (Aug. 26–30, 1996) pp40–52.

Czarnecki, Przemyslaw, et al., "Object–Oriented Representation of GDMO–Based Management Information Models (MIMs): Towards a Systematic Development of Network Management Software", IEEE Globecom 1996 Conference Record, vol. 1 of 3 (Nov. 18–22, 1996) pp675–679.

Horiuchi, Hiroki et al., "Implementation and Evaluation of ANMP/OSI Management Gateway for Management of TMN–based Equipments by SNMP Manager", Transactions of Information Processing Society of Japan, vol. 37, No. 11 (Nov. 1996) pp2083–2094.

Castelluccia, Claude et al., "Generating Efficient Protocol Code from an ABstract Specification", IEEE/ACM Transactions on Networking, vol. 5, No. 4 (Aug. 1997) pp514–524.

Soukouti, Nader, "Automatic Translation of OSI Managed Object Classes to C + + Classes", IEEE Journal on Selected Areas in Communications, vol. 12, No. 6, Aug., 1994.

Generic TMN Services Development Group, "Management Information Repository (MIR) API".

CITT Recommendation X.722, "Data Communication Networks, Information Technology—Open Systems Interconnection—Structure of Management Information: Guidelines For the Definition of Managed Objects," CCITT Geneva, 1992.

ITU–T Recommendation X.208, "Open Systems Interconnection Model and Notation, Specification of Abstract Syntax Notation One (ASN.1)," International Telecommunication Union, 1993.

* cited by examiner

FOREIGN OBJECT DEFINITION INFORMATION REPOSITORY

1. FIELD OF THE INVENTION

The present invention relates generally to object-oriented or object-based distributed object management technology, and more specifically to a repository for foreign object definition information, a gateway for manipulating foreign objects using such foreign object definition information, and a network management system using such a gateway.

2. BACKGROUND

Object-oriented and object-based programming techniques encapsulate computer programs and data in objects which separate implementation details from the contractual interface through which the objects are used. An object's interface defines the object's type, and is the view of the object exposed and accessible from outside the object. The interface is a usually a, listing of the operations and attributes that an operation provides. For example a, typical object interface includes the object's methods and their signatures together with any externally accessible fields. The details of the object's implementation other than those reflected in the interface are hidden. See Booch, Object-Oriented Analysis and Design, Addison-Wesley (1994). Objects are invoked through their interface.

Because an object invocation must conform to the object's interface, any entity seeking to invoke an object must have access to interface definition information for the object at the time it makes the invocation.

Interface information may be acquired either statically or dynamically. Statically acquired interface information is typically compiled or built into an invoking entity (usually another object), and cannot be changed without recompiling or modifying that entity. Dynamically acquired interface information, on the other hand, is typically acquired at run-time, and permits the construction of an invocation of an object having an interface that was unknown to the invoking entity prior to run-time.

Interface definition information may be acquired dynamically by interrogating objects for interface information about themselves, as for example through the Java introspection mechanism, or by acquiring the interface information from some other object or program as in the case of the CORBA Interface Repository.

Object interfaces are specified in a variety of ways. In an object-oriented language, an interface may be defined concretely by simply implementing it in an object. Alternatively, the interface may be specified apart from any object or class implementing the interface. Some object-oriented languages, such as Java, include an interface declaration keyword for abstractly defining interfaces. Abstract or virtual classes can also be used for this purpose in some languages.

A higher degree of abstraction and implementation independence may be achieved by defining interfaces in a language-independent interface definition notation. An interface defined this way may typically be implemented in more than one language, and objects so implemented in one language may typically invoke services of objects implemented in another language. In a distributed object-oriented environment, the ability to connect objects implemented in a variety of languages is a significant benefit.

One distributed object-oriented environment with multiple-language support is the Common Object Request Broker Architecture ("CORBA") specification published by the Object Management Group. CORBA interfaces are defined abstractly using the CORBA Interface Definition Language ("CORBA IDL"), a declarative notation for defining interfaces. CORBA IDL is the means by which clients learn what operations are available from an object, and how they should be invoked.

The CORBA specification includes language mappings by which an interface defined in CORBA IDL is translated into "stub" code implementing the interface for an invoking object, and "skeleton" code implementing the interface on the invoked object. CORBA IDL language mappings exist for a variety of languages including Smalltalk, C++ and Java. See The Common Object Request Broker: Architecture and Specification, Revision 2.0, July 1995, updated July 1996.

Another distributed object-oriented environment supporting language-independent object definitions is included in the Open System Interconnection (OSI) network management standards published by the International Organization for Standardization (ISO). The Common Management Information Protocol (CMIP) and the Common Management Information Service Element (CMISE) defined in these standards incorporate a distributed object model for network management. This model is described in part in CCITT Recommendation X.722 (1992), "Information Technology—Open Systems Interconnection—Management Information Services—Structure of Management Information: Guidelines for the Definition of Managed Objects." Objects defined in accordance with Recommendation X.722 are referred to in this specification as "GDMO objects."

In the OSI world, objects are specified in GDMO/ASN.1. "ASN.1" refers to Abstract Syntax Notation One, a complex type definition notation. GDMO/ASN.1 object definitions are based on a set of templates used to describe managed objects used for network management and control. Among other object information, ASN.1 is used to define transfer syntaxes which can be used to invoke GDMO objects. ASN.1 is specified in ITU-T Recommendation X.208, "Specification of Abstract Syntax Notation One (ASN.1.)".

When objects defined in one scheme (such as CORBA, for example) are used to manipulate (for example to invoke or instantiate) objects defined in another scheme (such as GDMO/ASN.1, for example), object definition information, including interface information must be somehow acquired across definition schemes.

Object definition information may be acquired across definition schemes by translating definitions from one scheme into the other. However, a syntactic or semantic mismatch between the schemes may make the translation or its results cumbersome or unworkable.

GDMO/ASN.1, for example, supports a richer variety of types than does CORBA IDL. Translation into CORBA IDL from ASN.1 often leads to unmanageable CORBA IDL definitions, and very large executables. Also, CORBA IDL translated from GDMO/ASN.1 is typically incomplete because information is lost during the translation process. The resulting collection of managed object definition information may not contain all the required information to perform CMISE operations.

There is therefore a need to provide a system for permitting objects having definitions in one definition notation to access object definitions specified in a different object definition notation in a manner that does not cause information to be lost in the process.

Accordingly, it is one objective of the present invention is to provide a first set of object definition information specified in a first notation to objects specified at least in part in a second notation without translating the first object definition information into the second object definition notation.

Another objective of the invention is to provide a means by which objects specified at least in part in a first object definition notation can invoke objects specified at least in part in a second object definition notation.

A further objective of the invention is to provide a means by which objects can instantiate objects defined at least in part in a foreign object definition notation.

Another objective of this invention is to provide a metadata repository by which a objects can use interfaces defined in a first object definition notation to discover object definitions specified in a second object definition notation.

3. SUMMARY

The invention accomplishes these and other objectives by encapsulating foreign object definition information in encapsulator objects having native interfaces. The encapsulated foreign object definition information need not be translated into native definition notation, but may be discovered by interrogating the encapsulator objects using their native interfaces.

Encapsulator objects can include all information contained in GDMO/ASN.1 specifications, in any suitable format. Encapsulated information may be discovered by invoking the encapsulator objects on their CORBA interfaces without translating the encapsulated specifications into CORBA IDL.

The invention also encompasses the use of encapsulator objects in a foreign object definition information repository. Such a repository includes supporting objects that provide additional services for run-time discovery of foreign object definition information, such as searching for specific types of foreign object definitions.

The encapsulator objects and metadata repository of the invention may be used to construct a dynamic gateway that does not require compile-time information of object definitions of objects using its services. All information necessary for adaptation of the dynamic gateway can be provided through the metadata repository. Such a gateway may be provided as an off-the-shelf application for deployment in a variety of environments.

4. BRIEF DESCRIPTION OF THE DRAWINGS

5. DETAILED DESCRIPTION OF THE INVENTION

Figure 1:
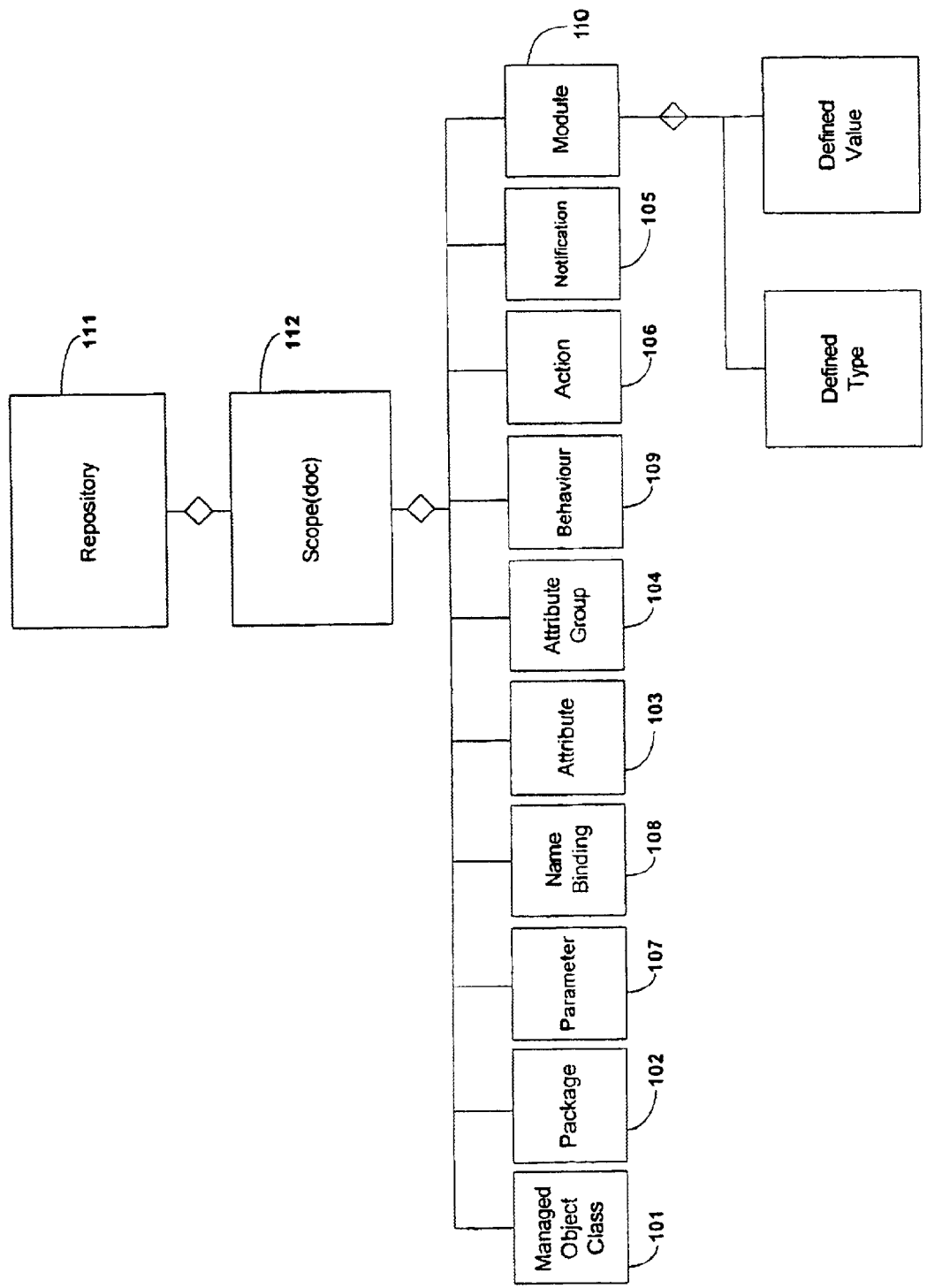
FIG. 1 is a block diagram of an object definition metadata repository showing encapsulator and support object types.

In one embodiment, the invention comprises a method and system for encapsulating object definition information expressed in a first notation in encapsulator objects defined at least in part in a second, typically different notation. In a preferred embodiment, the encapsulator objects expose interfaces defined in the second notation. This specification refers to such a first notation as foreign notation, and such a second notation as native notation. Corresponding objects, object definitions, interfaces, interface information and interface definitions are also referred to as "foreign" and "native" respectively.

In a preferred embodiment, encapsulator objects are created by a parser that parses foreign notation. For example, in one preferred embodiment, the parser accepts foreign object definition information expressed in foreign notation and instantiates one or more encapsulator objects for each rule (such as a production) in a grammar that corresponds to the syntactic structure defined in the foreign notation. The resulting collection of encapsulator objects reflects the syntactic structure of the foreign object definition information. The encapsulator objects expose native interfaces that may be interrogated to discover the foreign object definition information they encapsulate.

Standard compiler generation tools such as lex and yacc may used to create a parser, such as a parser for GDMO/ASN.1 specifications, in accordance with the present invention. The system may in addition resolve ISO object identifiers into their integer components, perform semantic checking and resolve informal references to other specifications.

For example, an informal reference such as "CCITT Recommendation X.721:1992" may be resolved to a file name such as "x721.gdmo". Textual references are resolved to CORBA object references. For example, "CCITT Recommendation X.721:1992:top" would be resolved to a pointer to the CORBA object encapsulating the first specification in Recommendation X.721. An ISO object identifier such as {joint-iso-ccitt ms(9) smi(3) part2(2) asn1Module(2) 1} would be resolved to {2 9 3 2 2 1}.

The parser may be included in an object factory (an object which instantiates and initializes other objects) which instantiates CORBA objects corresponding to the nonterminals of the syntax defined by GDMO/ASH.1 specifications. The resulting CORBA objects may be interrogated by other CORBA objects through their CORBA interfaces to discover the encapsulated GDMO object definitions. No translation of the encapsulated GDMO object information into CORBA IDL is required, avoiding the problems posed by the differences between CORBA and GDMO syntax and semantics.

In a preferred embodiment, the encapsulator objects have predefined native interfaces. This permits invocation of the encapsulator objects without run-time discovery of their native interfaces. An alternative embodiment includes encapsulator objects that have native interfaces that are not predefined. Such encapsulator interfaces may depend upon the foreign interface definitions which they encapsulate, or be determined by other information available at the time the encapsulator objects are instantiated. Still another embodiment includes the use of pseudo-objects accessible through, for example, the CORBA Dynamic Skeleton Interface (DSI). Such a pseudo-object embodiment could, for example, parse foreign object definitions at run-time in response to invocations on a pseudo-object, or store foreign object definition information in a database.

The type structure of the encapsulator objects may reflect the type structure of the foreign interfaces which they encapsulate. For example, in a preferred embodiment, a CORBA GDMO repository includes CORBA encapsulator object types corresponding to GDMO templates, including Managed Object Class Template (101), Package Template (102), Attribute Template (103), Attribute Group Template (104), Notification Template (105), Action Template (106), Parameter Template (107), Name Binding Template (108) and Behavior Template (109). In addition, a CORBA encapsulator object for a Module ASN.1 container type is included (110), as shown in FIG. 1.

In a preferred embodiment, the collection of encapsulator objects has the form of a metadata repository. In such an embodiment, support objects provide services for the discovery of encapsulator objects. For example, a foreign object definition metadata repository could provide a class having a native interface that accepts invocations for all encapsulator types, and which parses the invocations using the encapsulator objects. Other services, such as for iteration through the encapsulator objects in the repository, or sophisticated query and/or scoping services may be provided, permitting the discovery of encapsulator objects having only a certain type or property.

A foreign object definition metadata repository may be used in applications requiring dynamic discovery of foreign object definitions. An example of such an application is a CORBA based GDMO browser, which would use predefined CORBA interfaces to discover and present information from the repository, and could permit manipulation on the fly of GDMO objects having definitions encapsulated in encapsulator objects visible to the browser. Other examples such as a dynamic gateway or code generator are described in greater detail below.

In one preferred embodiment, the encapsulator repository has the form of a GDMO repository, and a containment structure as shown in FIG. 1. In the GDMO repository of this embodiment, a CORBA GDMO Repository object (111) contains one or more CORBA GDMO Document objects (112). Each Document object in turn contains one or more CORBA objects of types corresponding to GDMO template and ASN.1 Module types.

By using the services of the Repository and Document supporting objects, CORBA client objects can discover CORBA encapsulator objects encapsulating particular GDMO template types and/or originating in a particular GDMO definition document. For example, the Repository object (111) could be interrogated to discover all available objects encapsulating GDMO Attribute Group template types. Or a Document object corresponding for example to CCITT Recommendation X.721 could be interrogated to discover all objects encapsulating GDMO Action template types specified in that Recommendation.

Encapsulator objects, parsers of object definition information and object factories for instantiating encapsulator objects, as well as supporting objects for discovery of encapsulator objects and applications using these structures may be constructed in a variety of ways that will be readily apparent to those of ordinary skill working in the distributed object and network management fields.

Encapsulator objects may be used to advantage in a number of applications. In particular, gateways for manipulating foreign objects may be readily implemented through the use of encapsulator objects to construct invocations on foreign objects.

In a preferred embodiment, a dynamic gateway uses a foreign object definition metadata repository to manipulate foreign objects at run time in response to requests on native interfaces for services requiring use of those foreign objects.

Figure 2:
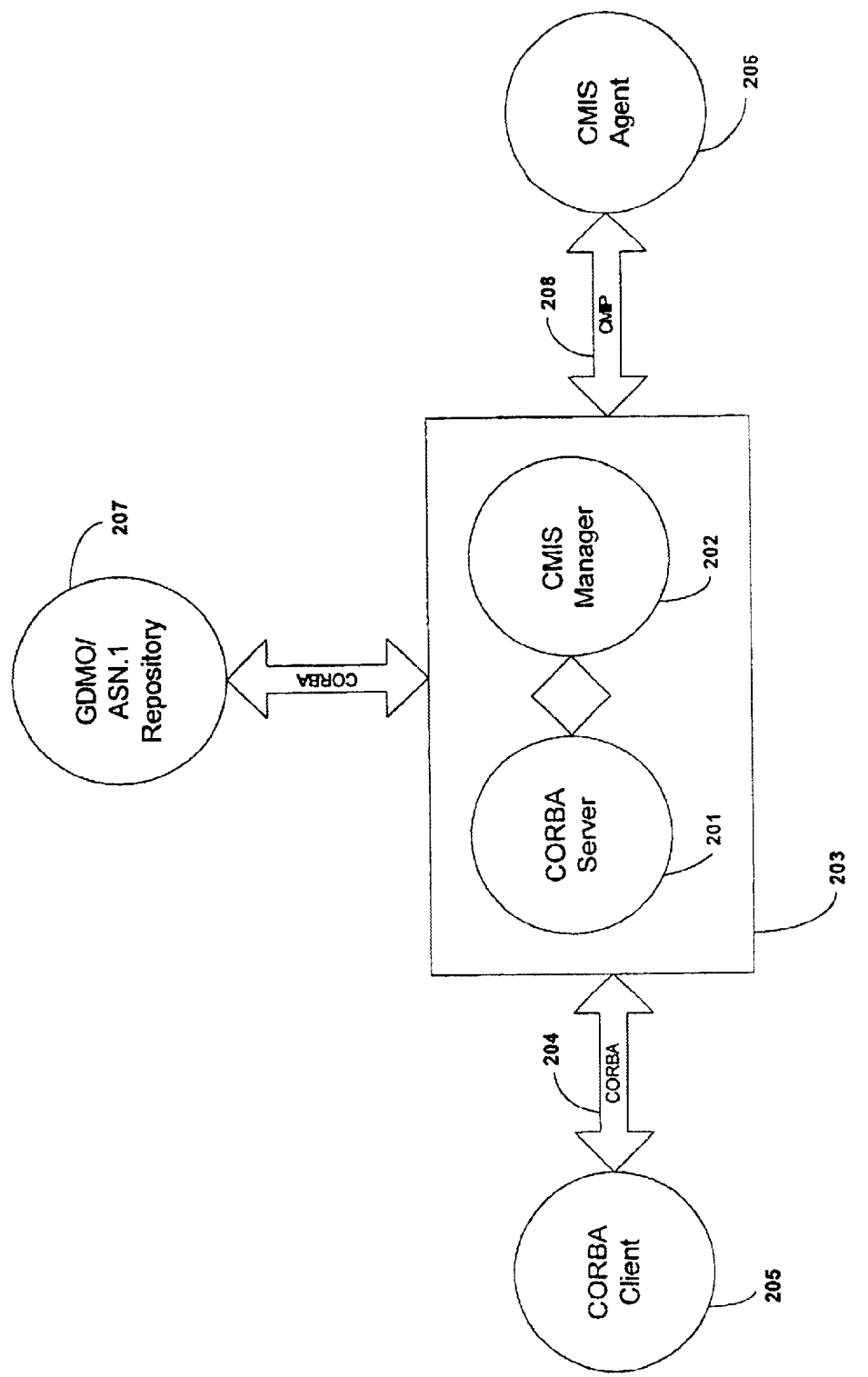
FIG. 2 is a block diagram of a dynamic CORBA/CMIS gateway comprising a object definition metadata repository.

In one preferred embodiment, a dynamic CORBA/CMIS gateway is implemented through the use of a foreign object definition repository as shown in FIG. 2. The gateway includes both a CORBA server (201) and a CMIS manager (202) interoperating as a single application (203). The CORBA server (201) exports a CORBA interface (204) through which one or more CORBA clients such as (205) may utilize CMIS services and CMIP (208) to invoke services of a CMIS agent (206). Encapsulator objects in a GDMO/ASN.1 repository (207) are referenced by the CORBA server (201) to provide the object definition information required by the CMIS manager to manipulate one or more CMIS agents such as (206).

The dynamic CORBA/CMIS gateway (203) is a generic application that can accept a variety of requests from CORBA objects such as (205) for CMIS operations without compile-time knowledge of the GDMO/ASN.1 definitions for the CMIS operations requested. By using CORBA DSI, the generic gateway can accept invocations on CORBA IDL interfaces that depend on the CMIS operations desired and parse those invocations using the GDMO/ASN.1 repository. The generic gateway can thus be deployed off-the-shelf in a variety of environments by encapsulating the CMIS operation dependent information for each environment in the foreign interface repository.

In this embodiment, upon receipt of a request using DSI for a CMIS operation from a CORBA object, the dynamic gateway invokes a root repository object using managed object class name information included in the request. The root repository object returns a reference to an encapsulator object corresponding to a managed object class template specified by the name. The managed object class template object corresponds to the root of a subtree of encapsulator objects that fully defines the class. The subtree objects correspond to GDMO template types.

Figure 3:
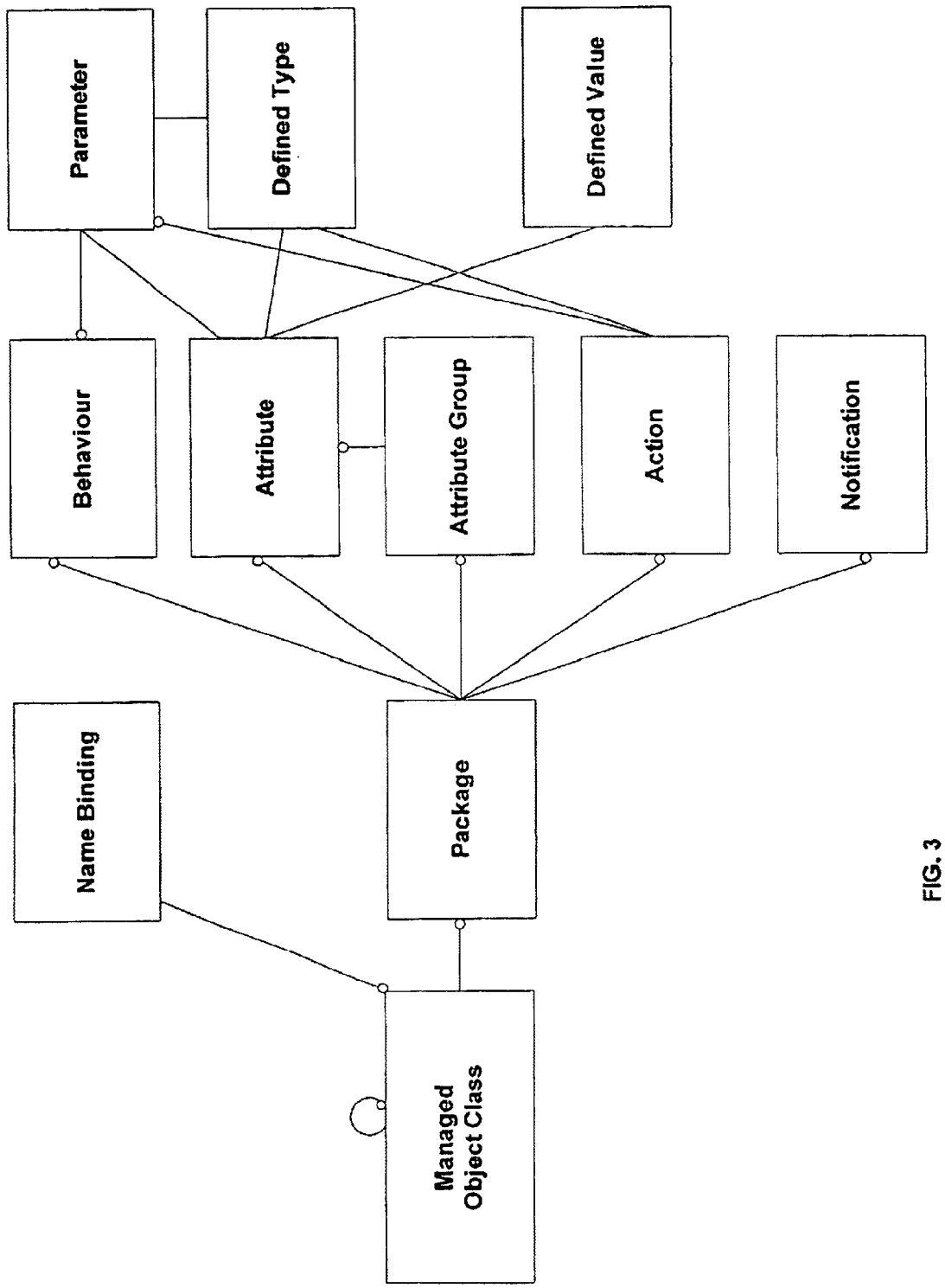
FIG. 3 is a block diagram comprising a greatly simplified representation of a collection of encapsulator objects and references corresponding to a completely specified GDMO/ASN.1 object definition.

The managed object class object is invoked using additional information (for example, attribute information) from the request, and returns one or more references to encapsulator objects in the subtree and/or one or more terminals representing symbols in the parsed request. Any referenced objects are in turn invoked, and the subtree is traversed in this manner until the request is resolved into a collection of CORBA object references that corresponds to a completely specified GDMO/ASN.1 object definition. Operation name information in the request is parsed in a similar manner. The specified definitions are then used to construct the requested CMIS operation invocation. FIG. 3 represents a simplified representation of such a collection of encapsulator object references. A typical collection of references in practice would be far more complex.

The dynamic gateway of this embodiment uses the CORBA Dynamic Skeleton Interface to accept CORBA invocations including CCRBA IDL definitions not available to the gateway at compile time. The gateway uses the predefined CORBA interfaces of the GDMO metadata repository to discover the actual parameters being passed by the invocation as well as how to use those parameters to construct the requested CMIS operation invocation. The gateway can thus accept invocations having CORBA interfaces that depend on the CMIS operation requested without compile-time knowledge of either the complete CORBA requesting interface or the CMIS operation. The gateway can therefore be an off-the-shelf application adaptable through the repository to wide variety of circumstances.

For example, in a typical network management situation, a variety of devices such as routers, switches, adapters, modems, printers and other computer and communication equipment are connected to the managed network. Instances of managed object classes are used to control these devices, and will have object definitions that vary depending on the particular devices connected to the managed network. By placing the managed object definition information into encapsulator objects in accordance with the present invention, a dynamic gateway may be deployed over a variety of managed networks without modification to the gateway software.

Many other applications for foreign object definition encapsulator objects exist. One such application is a lightweight code generator. Such a code generator may be used for the creation of classes that may directly invoke foreign objects. For example, a CORBA code generator could interrogate a GDMO repository to construct Java or C++ code for directly invoking GDMO objects. It will be apparent to one of ordinary skill that invention is not limited to the specific embodiments set forth here for purposes of illustration but is applicable broadly to a wide variety of applications involving object manipulation across definition schemes, all as set forth in the claims.

What is claimed is:

1. A computer readable medium comprising digital data working in conjunction with a computer to retrieve object definition information, said digital data comprising:

one or more computer programs for storing object definition information, said programs comprising a parser for object definition information;

an object factory for instantiating objects encapsulating said objects definition information without translating the object definition information, said objects having predefined interfaces in CORBA IDL; and a root encapsulator object for resolving object definition name information into an object reference to an encapsulator object corresponding to an object definition type.

2. A computer readable medium comprising digital data working in conjunction with a computer to retrieve object definition information, said digital data comprising:

one or more software objects, said software objects comprising at least one interface defined in a first notation for manipulating an object having an interface at least partially defined in a second notation without translating the at least partial definition from the second notation into the first notation, said second being different from said notation, wherein the first notation comprises COBRA IDL and the second notation comprises ASN.1.

3. A computer-based method of constructing an object invocation comprising the steps of:

instantiating a collection of objects corresponding to rules specifying the syntax of said object invocation;

receiving information of the content of the object invocation; and interrogating the object collection with the information to determine a set of objects sufficient to construct the invocation without translating the information into the syntax of the object invocation.

4. A computer-based method facilitating a calling object to invoke a target object, said method comprising the steps of:

instantiating one or more objects corresponding to an interface associated with said target object, each of said objects having an interface defined in a notation which is statically acquired by an invoker, whereby object invocation is performed without run-time discovery of interfaces, said target object's interface defined in a first notation; and facilitating said calling object to call said target object by invoking said one or more objects defined in said second notation without said calling object having to discover any interfaces at run-time.

5. A computer-based method facilitating a calling object to invoke a target object, as per claim 4, wherein said second notation comprises CORBA IDL.

6. A computer-based method facilitating a calling object to invoke a target object, as per claim 4, wherein said first notation comprises ASN.1.

7. A computer-based method facilitating a calling object to invoke a target object, as per claim 4, wherein said first notation comprises GDMO.

8. A computer-based method to obtain object definition information regarding an interface associated with a target object, said method comprising the steps of:

instantiating one or more objects corresponding to an interface associated with said target object, each of said objects having an interface defined in a second notation which is statically acquired by a receiver, whereby such reception is performed without run-time discovery of interfaces, said target object's interface defined in a first notation; and obtaining object definition information regarding said target object by invoking said one or more objects defined in said second notation without having to discover any interfaces at run-time.

9. A computer-based method to obtain object definition information regarding an interface associated with a target object, as per claim 8, wherein said second notation comprises CORBA IDL.

10. A computer-based method to obtain object definition information regarding an interface associated with a target object, as per claim 8, wherein said first notation comprises ASN.1.

11. A computer-based method to obtain definition information regarding an interface associated with a target object, as per claim 8, wherein said first notation comprises GDMO.

12. An article of manufacture comprising a computer usable medium having computer readable program code facilitating a calling object to invoke a target object, said medium comprising:

computer readable program code instantiating one or more objects corresponding to an interface associated with said target object, each of said objects having an interface defined in a second notation which is statically acquired by an invoker, whereby object invocation is performed without run-time discovery of interfaces, said target object's interface defined in a first notation; and computer readable program code facilitating said calling object to call said target object by invoking said one or more objects defined in said second notation without said calling object having to discover any interfaces at run-time.

13. An article of manufacture comprising a computer usable medium having computer readable program code facilitating the reception of object definition information regarding an interface associated with a target object, said medium comprising:

computer readable program code instantiating one or more objects corresponding to an interface associated with said target object, each of said objects having an interface defined in a second notation which is statically acquired by a receiver, whereby such reception is performed without run-time discovery of interfaces, said target object's interface defined in a first notation; and computer readable program code facilitating the acquirement of object definition regarding said target object by invoking said one or more objects defined in said second notation without having to discover any interfaces at run-time.

* * * * *